(12) United States Patent
Ritter et al.

(10) Patent No.: US 7,670,973 B2
(45) Date of Patent: Mar. 2, 2010

(54) LEAD AND ARSENIC FREE OPTICAL GLASS WITH HIGH REFRACTIVE INDEX

(75) Inventors: Simone Monika Ritter, Mainz (DE); Ute Woelfel, Mainz-Laubenheim (DE); Bianca Schreder, Frankfurt (DE); Stefanie Hansen, Gensingen (DE)

(73) Assignee: Schott AG, Mainz (DE)

( * ) Notice: Subject to any disclaimer, the term of this patent is extended or adjusted under 35 U.S.C. 154(b) by 554 days.

(21) Appl. No.: 11/586,198

(22) Filed: Oct. 25, 2006

(65) Prior Publication Data

US 2007/0249483 A1  Oct. 25, 2007

(30) Foreign Application Priority Data

Oct. 28, 2005 (DE) .................. 10 2005 052 090
Mar. 6, 2006 (DE) .................. 10 2006 010 554

(51) Int. Cl.
  C03C 3/253  (2006.01)
  C03C 3/12   (2006.01)
  C03C 3/14   (2006.01)
  C03C 3/064  (2006.01)

(52) U.S. Cl. .................. 501/42; 501/41; 501/49; 501/77

(58) Field of Classification Search .................. 501/41, 501/42, 49, 77
  See application file for complete search history.

(56) References Cited

U.S. PATENT DOCUMENTS

| 6,599,853 | B2* | 7/2003 | Sugimoto et al. | 501/50 |
| 6,653,251 | B2  | 11/2003 | Sugumoto et al. | |
| 7,141,525 | B2* | 11/2006 | Yamamoto et al. | 501/45 |
| 2003/0191006 | A1  | 10/2003 | Natsugaru et al. | |
| 2004/0254057 | A1* | 12/2004 | Schreder et al. | 501/53 |
| 2005/0037913 | A1* | 2/2005 | Peuchert et al. | 501/78 |
| 2005/0192174 | A1* | 9/2005 | Yamamoto et al. | 501/45 |
| 2006/0063660 | A1* | 3/2006 | Schreder et al. | 501/42 |

FOREIGN PATENT DOCUMENTS

| DE | 101 44 475 | 3/2003 |
| DE | 103 08 476 | 9/2004 |
| JP | 04106806 | 4/1992 |
| JP | 2001-213635 | 8/2001 |
| JP | 2002-201039 | 7/2002 |
| SU | 876 572 | 10/1981 |
| WO | 99/51537 | 10/1999 |
| WO | 01/55041 | 8/2001 |
| WO | 03/022755 | 3/2003 |
| WO | 03/022763 | 3/2003 |
| WO | 03/022764 | 3/2003 |
| WO | 03/022766 | 3/2004 |

* cited by examiner

*Primary Examiner*—Karl E Group
*Assistant Examiner*—Elizabeth A Bolden
(74) *Attorney, Agent, or Firm*—Michael J. Striker

(57) ABSTRACT

Lead and arsenic free, and preferably gadolinium and further preferably also fluorine free, optical glasses for the application fields mapping, projection, telecommunication, optical communication engineering, mobile drive, laser technology and/or micro lens arrays have a refractive index of $1.91 \leq n_d \leq 2.05$, an Abbe number of $19 \leq v_d \leq 25$ and have a low transformation temperature, namely of less than or equal to 470° C. and preferably of less than or equal to 450° C., as well as good producability and processability and crystallization stability.

12 Claims, 1 Drawing Sheet

LEAD AND ARSENIC FREE OPTICAL GLASS WITH HIGH REFRACTIVE INDEX

BACKGROUND OF THE INVENTION

The present invention relates to a lead and arsenic free, and preferably fluorine free optical bismuth oxide glass containing germanium oxide, to the use of such a glass in the fields of mapping, projection, telecommunication, optical communication engineering, mobile drive and laser technology, as well as to optical elements respectively preforms of such optical elements. The glass according to the present invention can also be used in the field of micro lens arrays for e.g. CCDs (charge coupled devices, such as e.g. semiconductor elements for image transformation).

In the recent years, the tendency on the market in the field of optical as well as opto-electronic technologies (application fields mapping, projection, telecommunication, optical communication engineering, mobile drive, laser technology and micro lens array) goes more and more into the direction of miniaturization. This can be seen with the finished products which become smaller and smaller and naturally requires an increasing miniaturization of the single structural members and components of such finished products. For the producers of optical glasses this development means a clear decrease of the demanded volumes of rough glass in spite of increasing quantities of finished products. At the same time, there is an increasing pricing pressure from the side of the reprocessors to the producers of glass, since with the production of such smaller components made of block and/or ingot glass noticeably more waste will be produced proportionally based on the product and for the processing of such miniature parts a higher operating expense is necessary than for larger structural members.

Instead of removing of glass portions for optical components from block or ingot glass, which is common till today, recently production procedures became important in which directly after the glass melt preforms may be yielded which preforms are as close as possible to the final contour respectively geometry, such as e.g. gobs or spheres. For example, the reprocessors' requests for preforms which are close to the final geometry for re-pressing, so-called "precision gobs", are increasing. Normally, these "precision gobs" preferably mean completely fire-polished, free or half-free formed glass portions which are already portioned and have a geometry which is close to the final form of the optical component.

Such "precision preforms" may preferably also be converted into optical elements such as lenses, aspheres, micro lens arrays etc. by the so-called "precise pressing" or "precise molding" or "precise blank pressing". Then, a further processing of the geometric form or the surface with e.g. a surface polish is no longer required. This procedure can comply with the smaller volumes of melted glass (distributed on a high number of small parts of material) in a flexible way by shorter set-up times. However, because of the relatively lower number of parts per time unit and the normally smaller geometries, the creation of value cannot be caused by the value of the material alone. Rather, the products have to leave the press in a state ready for installation, i.e. laborious post-processing, cooling and/or cold reprocessing must not be necessary. Because of the required high accuracy of geometries, precision instruments with high grade and therefore expensive mold materials have to be used for such a pressing procedure. The lifetimes of such molds massively affect the profitability of the products and/or materials produced. A very important factor for a long lifetime of the molds is a working temperature which is as low as possible, but which can only be lowered to a point at which the viscosity of the materials to be pressed is yet sufficient for the pressing procedure. This means, that there is a direct relationship between the processing temperature and therewith the transformation temperature Tg of a glass to be processed and the profitability of such a pressing process: The lower the transformation temperature of the glass, the longer the lifetimes of the molds; and therefore the higher the earnings. Thus, there is a demand for so-called "low Tg glasses", i.e. glasses having low melting points and transformation temperatures, i.e. glasses with a viscosity at temperatures which are as low as possible which is sufficient for processing.

Further, from a process technical point of view of the melt there is a growing demand for "short" glasses, i.e. glasses having a viscosity which varies strongly within a certain viscosity range at a relatively small change in temperature. This behaviour has the advantage in the melting process that the times of hot forming, i.e. the closure times of the molds, can be decreased. Because of that, on the one hand the throughput will be increased, i.e. the cycle times will be reduced. On the other hand, because of that also the mold material will be protected which also has a positive effect on the total production costs, as described above. Such "short" glasses have the further advantage that also glasses with higher tendency to crystallization may be processed by the faster cooling than with corresponding longer glasses. Therewith prenucleation which could cause problems in succeeding steps of secondary hot forming will be avoided. This presents the possibility that such glasses may also be stretched to fibres.

Furthermore it is also desirable that, besides the mentioned and the required optical properties, the glasses are sufficiently chemically resistant and have an expansion coefficient which is as low as possible.

The prior art already describes glasses with similar optical state or with a comparable chemical composition, but these glasses have immense disadvantages. In particular, many of the glasses contain higher proportions of $SiO_2$ which is a network forming agent and therefore increases the transformation temperature of the glass, creates a longer viscosity curve and reduces the refractive index, and/or components such as e.g. F and $P_2O_5$ which readily can evaporate during the melting and burning process, thus an exact adjustment of the glass composition is difficult. This evaporation is also disadvantageous during the pressing method, wherein the glass is heated again and may deposit at the surface of the molds and on the glass.

JP 2002/201039 describes a $Bi_2O_3$ containing glass with high refractive index for press molding. However, the basic glass type only contains small amounts of $GeO_2$.

JP 04-106806 comprises a dielectric composite. The glass ingredient contains in every case CeO.

The documents WO 99/51537, JP 2001/213635, WO 01/55041, WO 03/022764, DE 10 144 475 and WO 03/022755 describe optically active glasses which in every case contain optically active rare earths.

WO 03/022763 and WO 03/022766 describe optically active glasses which are doped with at least one optically active rare-earth element and which also may contain bismuth oxide and germanium oxide, wherein however the ratio of these oxides is at least 10 for the exactly described glasses which actually contain germanium oxide as a component, i.e. the glasses have a relatively high content of bismuth oxide. According to WO 03/022766, all glasses are melted in a platinum crucible which in every case will result in the fact that the glasses contain a platinum component in amounts of higher than 3 ppm which has a negative effect on the position of the UV edge of the glasses.

DE 10 308 476 describes a bismuth containing glass which in every case contains the components $B_2O_3$ respectively $SiO_2$, the sum of which is at most 5% by mole. SU 876572 describes an optical glass for acoustic-optical devices. However, it contains in every case more than 22% by weight of $GeO_2$.

SUMMARY OF THE INVENTION

The object of the present invention is[[,]] is to provide an optical glass with which desired and advantageous optical properties ($n_d/v_d$) with concurrent low transformation temperatures can be realized, in particular also by virtue of ecological considerations without the use of PbO, $Tl_2O$, $TeO_2$ and $As_2O_3$ and preferably also without fluorine and $Gd_2O_3$. Further, the glasses should have a position of the UV edge $\lambda_c$ (5 mm) of lower than or equal to 410 nm and should be processible by the blank pressing method (precise pressing) and should be suitable for the application fields mapping, projection, telecommunication, optical communication engineering, mobile drive and laser technology, should have a refractive index $n_d$ of $1.91 \leq n_d \leq 2.05$, an Abbe number $v_d$ of $19 \leq v_d \leq 25$ and preferably a transformation temperature which is as low as possible of $Tg \leq 470°$ C. The meltability and processability of them should also be well and they should have sufficient crystallization stability which makes a production in continuously conducted aggregates possible. A glass which is as "short" as possible within a viscosity range of $10^{7.6}$ to $10^{13}$ dPas is desirable. With a so-called short glass generally a glass is meant which within the viscosity range of $10^2$ to $10^{13}$ dPas has a very steep viscosity curve. For the glasses according to the present invention the term "short" should belong to the viscosity range of $10^{7.6}$ to $10^{13}$ dPas.

In particular, a lead and arsenic and preferably fluorine free optical glass with a refractive index $n_d$ of $1.91 \leq n_d \leq 2.05$ and an Abbe number $v_d$ of $20 \leq v_d \leq 25$ is provided which comprises the following components (based on oxide in % by weight):

| | |
|---|---|
| $Bi_2O_3$ | 55-70 |
| $GeO_2$ | 13-21 |
| $SiO_2$ | 0-9 |
| $B_2O_3$ | 0-10 |
| $Li_2O$ | 0-5 |
| $Na_2O$ | 0-5 |
| $K_2O$ | 0-5 |
| $Cs_2O$ | 0-6 |
| MgO | 0-10 |
| CaO | 0-10 |
| SrO | 0-10 |
| BaO | 0-10 |
| ZnO | 0-10 |
| $TiO_2$ | 0-5 |
| $La_2O_3$ | 0-7 |
| $WO_3$ | 0-6 |
| $Nb_2O_5$ | 0-6 |
| Σ Alkali oxides | 0-5 |
| Σ Alkaline-earth oxides | 0-10 |
| Σ $La_2O_3$, $WO_3$, $Nb_2O_5$, $TiO_2$ | 0-8 |
| Conventional fining agents | 0-2 | wherein the ratio of $Bi_2O_3$ and $GeO_2$ is less than or equal to 5. Preferably, this ratio is less than or equal to 4. Preferably, the glasses according to the present invention contain at most 3 ppm of a platinum component, further preferably at most 2 ppm and most preferably less than or at most 1 ppm. To reach these preferable values of the platinum content, the glasses according to the present invention are preferably melted in a Pt-free melt aggregate, such as for example in a quartz tank. The preferably low contents of platinum components facilitate a position of the UV edge of less than or equal to 410 nm which is an unusual feature of the glasses with the desired high refractive indices.

The ratio of both main oxides of bismuth and germanium of at most 5 (that means of less than or equal to 5) may be achieved by the use of an amount of bismuth oxide which is as high as necessary to achieve the desired values of the glass transition temperatures in connection with the high refractive indices, but on the other hand, which is as low as possible, since this component renders the glasses sensitive for redox reactions and bismuth as an element effects an undesired discoloration of the glass, connected with poor transmission properties and the shift of the UV edge. Furthermore, glass melts, in particular as mixture with increasing bismuth proportion, are increasingly aggressive to melting crucibles.

Preferably the sum of $Bi_2O_3$ and $GeO_2$ is higher than or equal to 70% by weight.

Preferably, the glasses are free of not mentioned components.

Further, the invention relates to optical elements pressed from the described glasses, in particular prepared by precise pressing, as well as to a method for the production of optical elements by precise pressing of the described glasses.

The glasses according to the present invention have the same optical state, such as the Abbe number and the refractive index, than known optical glasses of similar glass families. However, they are featured by good meltability and processability, as well as by good environmental compatibility.

In particular, these glasses are suitable for processing close to the final contour, such as e.g. for the production of precision gobs, as well as for a precise pressing process for the production of an optical component having exact final contour. In this connection, preferably the viscosity temperature profile and the processing temperature of the glasses according to the present invention have been adjusted so that such hot forming close to the final geometry respectively final contour is also possible with sensitive precision machines.

In addition, the combination of crystallisation stability and viscosity temperature profile of the glasses according to the present invention may facilitate a thermal (further) treatment (pressing respectively re-pressing) of the glasses, almost without any problems.

In particular, the glasses according to the present invention have a refractive index $n_d$ of $1.91 \leq n_d \leq 2.05$, preferably of $1.92 \leq n_d \leq 2.04$, particularly preferably of 1.92 to 2.02, and an Abbe number of $20 \leq v_d \leq 25$, preferably of $20 \leq v_d \leq 24$.

According to an embodiment of the present invention, the glasses according to the present invention have a transformation temperature $Tg \leq 470°$ C., preferably $Tg \leq 450°$ C.

According to the present invention, by a so-called "low Tg glass" is meant a glass having a low transformation temperature Tg, i.e. preferably a Tg of at most 470° C.

Preferably, the glasses according to the present invention are as "short" as possible, in a viscosity range of $10^{7.6}$ to $10^{13}$ dPas. In this case, with "short glasses" glasses are meant which have a viscosity that varies strongly at a relatively small change of the temperature within a certain viscosity range.

Preferably, the temperature interval $\Delta T$, in which the viscosity of this glass decreases from $10^{7.6}$ to $10^{13}$ dPas, is at most 90 K, preferably at most 80 K.

BRIEF DESCRIPTION OF THE DRAWINGS

In FIG. 1, the vertical lines show the temperature interval $\Delta T$, in which the viscosity of this glass decreases from $10^{7.6}$ to $10^{13}$ dPas. In this case, $\Delta T$ is between 499 and 426° C., i.e. it is 73 K.

DETAILED DESCRIPTION OF THE PREFERRED EMBODIMENTS

Figure 1:
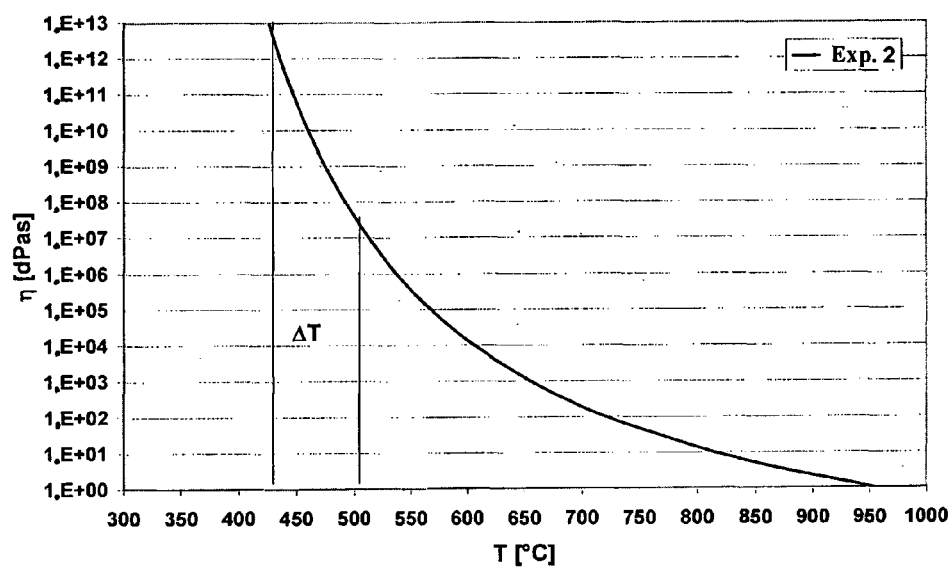
FIG. 1 shows the viscosity curve of a glass according to the present invention according to example glass 2.
Figure 2:
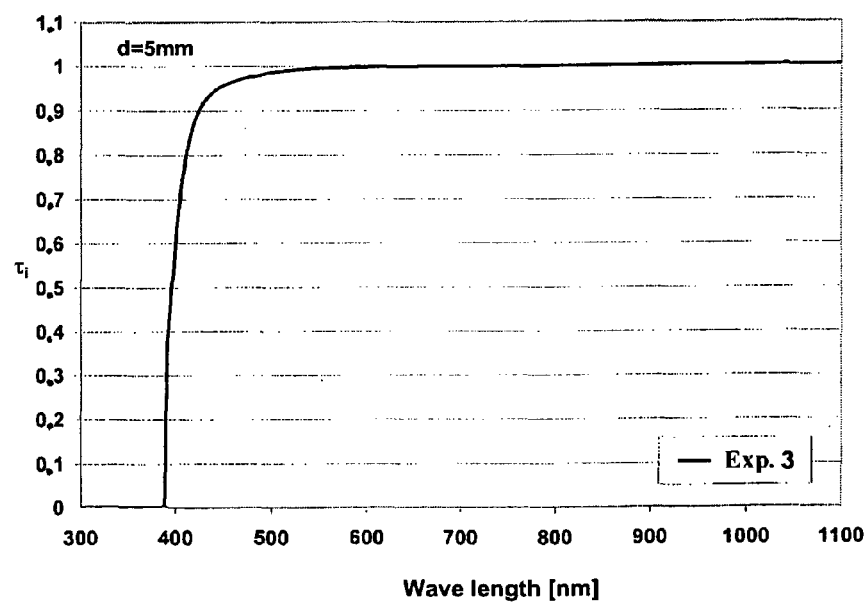
FIG. 2 shows an internal transmission curve of a glass according to the present invention according to example glass 3. In this case, the edge wave length $\lambda_c$ (5 mm) is 396 nm.

With the "inner quality" of a glass is meant according to the present invention, that the glass contains a proportion of bubbles and/or strias and/or similar defects which is as low as possible, respectively preferably, that it does not contain such defects at all.

In the following, the term "X free" or "X-free" respectively "free of a component X" means that the glass substantially does not contain this component X, i.e. that such a component is only present in the glass as an impurity, however that it is not added to the glass composition as a single component. Here, X represents an arbitrary component, such as for example F.

In the following, all proportion data of the glass components are given in % by weight and are based on oxide, unless otherwise stated.

The basic glass system of the glass according to the present invention is a germanium oxide containing bismuth oxide glass having a ratio of both components, bismuth oxide to germanium oxide, of at most 5 which is a good basis for the desired properties.

The glass according to the present invention has a proportion of $Bi_2O_3$ of at least 55% by weight, preferably of at least 56% by weight, particularly preferably of at least 57% by weight. The proportion of $Bi_2O_3$ is at most 70% by weight, preferably at most 68% by weight, particularly preferably at most 66% by weight. $Bi_2O_3$ contributes to the desired viscosity temperature behaviour ("short" glass) in the viscosity range of $10^{7.6}$ to $10^{13}$ dPas. Furthermore, it reduces the Tg and increases the density of the glass. The latter guarantees a high refractive index. The maximum proportion of 70% by weight should not be exceeded, since the self-colour of $Bi_2O_3$ would have a too negative effect on the transmission of the glass. However, the proportion should not fall below the minimum proportion of 55% by weight to guarantee the low Tg in combination with a high refractive index of the glass according to the present invention.

The glass according to the present invention has a proportion of $GeO_2$ of at least 13% by weight, preferably of at least 14% by weight, particularly preferably 15% by weight. The maximum proportion of $GeO_2$ is 21% by weight, preferably at most 20% by weight, further preferably at most 19% by weight. $GeO_2$ is a network forming agent, like $Bi_2O_3$ and stabilises the glass. $GeO_2$ together with $Bi_2O_3$ promote the high refractive index of the glass according to the present invention and the low transformation temperature. Furthermore, $GeO_2$ supports a high Abbe number. Therefore, the proportion should not fall below the given minimum proportion.

As a network forming agent, besides $Bi_2O_3$ and $GeO_2$, also $SiO_2$ may be incorporated into the glass. The glass according to the present invention contains at most 9% by weight, preferably at most 8% by weight of $SiO_2$, particularly preferably 7% by weight. As a possible lower limit of the component silicon oxide, an amount of 0.5% by weight of this component can be chosen.

The maximum proportion of $SiO_2$ should not be exceeded, because $SiO_2$ results in increased glass transition temperatures and viscosities of the glass as well as to a reduction of the refractive index.

The maximum proportion of $B_2O_3$ is 10% by weight, preferably at most 9% by weight, particularly preferably at most 8% by weight. The strongly network forming properties of $B_2O_3$ increase the stability of the glasses against crystallisation and the chemical resistance. However, the proportion should not exceed 10% by weight, because otherwise the glasses will become "longer" which is also not preferable according to the present invention. Further, during the melting and burning process portions of the added $B_2O_3$ may evaporate, thus an exact adjustment of the composition is difficult. The glass according to the present invention may contain $B_2O_3$ in an amount of at least 1% by weight, preferably 2% by weight.

The glass according to the present invention has a proportion of ZnO of at most 10% by weight, preferably of at most 7% by weight, particularly preferably of at most 5% by weight. ZnO contributes to the desired viscosity temperature behaviour ("short" glass) in the viscosity range of $10^{7.6}$ to $10^{13}$ dPas.

The glasses according to the present invention contain as alkali metal oxide $Li_2O$, $Na_2O$, $K_2O$ in an amount of at most 5% by weight, preferably of at most 4% by weight, more preferably of at most 3% by weight. The glass according to the present invention may contain $Li_2O$ in an amount of at least 0.5% by weight, preferably of at least 0.7% by weight.

If the glass contains caesium oxide, this is contained in amounts of at most 6% by weight, preferably of at most 5% by weight, more preferably of at most 4% by weight.

The sum of alkali metal oxides in the glass according to the present invention is 0 to 5% by weight. Preferable are at most 3% by weight, particularly preferable are at most 2% by weight. The sum of alkali metal oxides is at most 5% by weight, wherein this value should not be exceeded, because otherwise the refractive index of such a glass system will be lowered too much. The addition of the alkali metal oxides is for the optimisation of the burning behaviour, i.e. they have an effect as fluxing agents. Furthermore, they contribute to the lowering of the Tg.

For a flexible regulation of the viscosity temperature behaviour, the glass according to the present invention may optionally contain alkaline-earths which are selected from the group consisting of MgO, CaO, SrO and/or BaO. The proportion of the single component should not exceed 10% by weight, preferably 7% by weight, particularly preferably 6% by weight. The glass according to the present invention may contain MgO, CaO, SrO or BaO in an amount of at least 0.5% by weight, preferably of at least 1% by weight. The alkaline-earths contribute to a steep viscosity curve. The maximum proportion of 10% by weight should not be exceeded, since higher proportions in the glass result in devitrification, in particular during re-heating.

The glass according to the present invention may contain a proportion of $La_2O_3$ of at most 7% by weight, preferably of at most 6% by weight, and a proportion of $WO_3$ respectively $Nb_2O_5$ of at most 6% by weight, preferably of 5% by weight, particularly preferably of at most 4% by weight. With these components, the optical state can be adjusted. However, in higher proportions they result in a higher viscosity of the glass.

The glass is preferably free of $TiO_2$. It may contain 0 to at most 5% by weight, preferably at most 4, particularly preferably at most 3% by weight. $TiO_2$ contributes to a high refractive index and a high dispersion and may serve for the adjustment of the optical state. But the component results in increased Tgs and viscosities of the glass and it negatively affects the transmission through absorption in UV.

Preferably, the sum of the oxides $Bi_2O_3$ and $GeO_2$ is higher than or equal to 70% by weight, particularly preferably higher than or equal to 72, more preferably higher than or equal to 73% by weight. With this sum, the high refractive index in combination with the low Tg of the glass according to the present invention is guaranteed.

Preferably, the glass according to the present invention as an optical glass is also free of colouring and/or optically active, such as laser active, components.

In particular, the glass according to the present invention is also preferably free of components which are sensitive to redox reactions, such as for example Ag, and/or free of components which are toxic respectively bad for one's health, such as for example the oxides of Tl, Te, Be and As. In every case, the glass is free of PbO and arsenic.

According to an embodiment of the present invention, the glass according to the present invention is also preferably free of other components which are not mentioned in the claims, i.e. according to such an embodiment, the glass substantially consists of the components mentioned. In this case, the term "substantially consisting of" means that other components are only present as impurities; however that they are not intentionally added to the glass composition as a single component.

The glass according to the present invention may contain conventional fining agents in low amounts. Preferably, the amount of added fining agents is at most 2.0% by weight, more preferably at most 1.0% by weight. As fining agent, at least one of the following components may be contained in the glass according to the present invention (in % by weight, in addition to the residual glass composition):

| | | |
|---|---|---|
| $Sb_2O_3$ | 0-1 | and/or |
| SnO | 0-1 | and/or |
| $SO_4^{2-}$ | 0-1 | and/or |
| $F^-$ | 0-1 | |

Also fluorine and fluorine containing compounds tend to evaporation during the melting and burning process and thus make an exact adjustment of the glass composition difficult. Therefore, the glass according to the present invention is also free of fluorine.

Further, the present invention relates to the use of the glasses according to the present invention for the application fields mapping, projection, telecommunication, optical communication engineering, mobile drive and laser technology.

Further, the present invention relates to optical elements which comprise the glass according to the present invention. Here, optical elements may be in particular lenses, aspheres, prisms and compact structural members. In this case, according to the present invention the term "optical element" comprises also preforms of such an optical element, such as for example gobs, precision gobs and the like.

In the following, the present invention is explained in detail by a series of examples. But the present invention is not limited to the mentioned examples.

EXAMPLES

The following examples show preferable glasses according to the invention and should no limit the scope of protection thereof.

Example 1

The raw materials for the oxides are weighed out, one or more fining agents, such as e.g. $Sb_2O_3$, are added and subsequently they are mixed well. The glass mixture is melted into a continuous melting aggregate at ca. 970° C. and oxygen is bubbled in, then fined (970° C.) and homogenized. At a casting temperature of approximately 970° C., the glass can be cast and processed to the desired dimensions. Experience has shown that in the continuous aggregate of a high volume, the temperatures can be reduced for at least ca. 100 K and the material can be processed by the pressing method close to the final geometry.

TABLE 1

Melting example for 100 kg of calculated glass (according to example glass 6)

| Oxide | % by weight | Raw material | Weight (g) |
|---|---|---|---|
| $Bi_2O_3$ | 61.52 | $Bi_2O_3$ | 61,638.0 |
| $GeO_2$ | 15.98 | $GeO_2$ | 16,010.73 |
| $SiO_2$ | 2.24 | $SiO_2$ | 2247.33 |
| $B_2O_3$ | 5.88 | $H_3BO_3$ | 10,469.61 |
| $Li_2O$ | 0.79 | $Li_2CO_3$ | 1968.93 |
| BaO | 4.04 | $Ba(NO_3)_2$ | 6878.04 |
| ZnO | 4.29 | ZnO | 4298.21 |
| $La_2O_3$ | 5.16 | $La_2O_3$ | 5170.08 |
| $Sb_2O_3$ | 0.1 | $Sb_2O_3$ | 100.56 |
| Sum | 100.0 | | 108,781.49 |

The properties of the glass thus obtained are given in table 2 in example 6.

TABLE 2

Example glasses 1 to 6 (data are based on oxide in % by weight):

| | Example No. | | | | | |
|---|---|---|---|---|---|---|
| Oxides | 1 % by weight | 2 % by weight | 3 % by weight | 4 % by weight | 5 % by weight | 6 % by weight |
| $SiO_2$ | 2.63 | 2.30 | 7.10 | 6.60 | 8.30 | 2.24 |
| $B_2O_3$ | 6.11 | 6.02 | 5.60 | 5.50 | 5.50 | 5.88 |
| $GeO_2$ | 17.74 | 17.49 | 16.30 | 16.30 | 15.90 | 15.98 |
| $Li_2O$ | 0.82 | 0.81 | 0.76 | 0.76 | 0.74 | 0.79 |

TABLE 2-continued

Example glasses 1 to 6 (data are based on oxide in % by weight):

| Oxides | Example No. | | | | | |
|---|---|---|---|---|---|---|
| | 1 % by weight | 2 % by weight | 3 % by weight | 4 % by weight | 5 % by weight | 6 % by weight |
| $Na_2O$ | | | | | | |
| $K_2O$ | | | | | | |
| $La_2O_3$ | 0.06 | 1.76 | 2.10 | 1.90 | 2.00 | 5.16 |
| $Bi_2O_3$ | 63.86 | 62.99 | 60.00 | 60.40 | 59.40 | 61.52 |
| MgO | | | | | | |
| CaO | | | | | | |
| SrO | | | | | | |
| BaO | 4.20 | 4.14 | 3.90 | 4.10 | 3.90 | 4.04 |
| ZnO | 4.46 | 4.40 | 4.20 | 4.30 | 4.20 | 4.29 |
| $TiO_2$ | | | | | | |
| $WO_3$ | | | | | | |
| $Sb_2O_3$ | 0.20 | 0.10 | 0.09 | 0.10 | 0.12 | 0.1 |
| Σ | 100.08 | 100.0 | 100.1 | 100.0 | 100.1 | 100.0 |
| $n_d$ [7K/h] | 1.99752 | 2.00334 | 1.93671 | 1.94277 | 1.92286 | 2.01083 |
| $v_d$ [7K/h] | 20.75 | 20.74 | 22.97 | 22.77 | 23.43 | 20.75 |
| $P_{g,F}$ | 0.6383 | 0.6388 | 0.6272 | 0.628 | 0.6251 | 0.6397 |
| $\Delta P_{g,F}$ | 0.0294 | 0.0299 | 0.0221 | 0.0225 | 0.0207 | 0.0308 |
| $\alpha_{(20, 300°C.)}$ [$10^{-6}$/K] | 9.40 | 9.45 | 8.78 | 8.84 | 8.64 | 9.54 |
| Tg [°C.] | 427 | 432 | 453 | 446 | 456 | 432 |
| $T(\eta = 10^{7.6} dPas)$ [°C.] | | 499 | 528 | 523 | 528 | 505 |
| $\Delta T = [T(\eta = 10^{7.6})-T(\eta = 10^{13} dPas)]$ [K] | | 73 | 80 | 81 | 78 | 78 |
| $\rho$ [g/cm$^3$] | 6.1 | 6.2 | 5.8 | 5.8 | 5.7 | 6.2 |

TABLE 3

Example glasses 7 to 11 (data are based on oxide in % by weight):

| Oxides | Example No. | | | | |
|---|---|---|---|---|---|
| | 7 % by weight | 8 % by weight | 9 % by weight | 10 % by weight | 11 % by weight |
| $SiO_2$ | 2.33 | 2.41 | 2.35 | 2.35 | 1.97 |
| $B_2O_3$ | 6.12 | 6.00 | 6.15 | 6.16 | 5.9996 |
| $GeO_2$ | 17.76 | 17.42 | 17.86 | 17.90 | 17.4288 |
| $Li_2O$ | 0.82 | | 0.50 | 0.83 | 0.81 |
| $Na_2O$ | | 1.67 | | | |
| $K_2O$ | | | 1.04 | | |
| $La_2O_3$ | 5.36 | 0.00 | 1.80 | 2.71 | |
| $Bi_2O_3$ | 58.85 | 65.24 | 64.33 | 59.29 | 65.30 |
| MgO | 0.00 | 0.43 | 0.45 | | |
| CaO | | 0.00 | 0.93 | | |
| SrO | | | | 0.00 | 1.1245 |
| BaO | 4.20 | 2.47 | 0.00 | 4.24 | 2.47 |
| ZnO | 4.46 | 4.38 | 4.49 | 4.50 | 3.9397 |
| $TiO_2$ | | | | | 0.86 |
| $WO_3$ | | | | 1.92 | |
| $Sb_2O_3$ | 0.1 | 0.1 | 0.1 | 0.1 | 0.1 |
| Σ | 100.0 | 100.1 | 100.0 | 100.0 | 100.0 |
| $n_d$ [7K/h] | 1.98991 | 1.99259 | 1.99029 | 1.99067 | 2.02251 |
| $v_d$ [7K/h] | 21.57 | 20.2 | 20.67 | 21.26 | 19.88 |
| $P_{g,F}$ | 0.6351 | 0.6419 | 0.6392 | 0.6373 | 0.6439 |
| $\Delta P_{g,F}$ | 0.0276 | 0.0321 | 0.0302 | 0.0293 | 0.0335 |
| $\alpha_{(20, 300°C.)}$ [$10^{-6}$/K] | 9.31 | 9.82 | 9.44 | 9.33 | 9.45 |
| Tg [°C.] | 437 | 426 | 432 | 434 | 423 |
| $T(\eta = 10^{7.6} dPas)$ [°C.] | 517 | | 505 | 513 | |
| $\Delta T = [T(\eta = 10^{7.6})-T(\eta = 10^{13} dPas)]$ [K] | 83 | | 78 | 78 | |
| $\rho$ [g/cm$^3$] | 6.1 | 6.1 | 6.0 | 6.1 | 6.2 |

The glasses according to the present invention have a glass transition temperature Tg of less than or equal to 470° C., can be processed well and have a very good resistance against alkalis (good alkali resistance).

The invention claimed is:

1. A lead-free and arsenic-free optical glass with a refractive index $n_d$ of $1.91 \leq n_d \leq 2.05$ and an Abbe number $v_d$ of $19 \leq v_d \leq 25$, wherein said optical glass having a composition consisting essentially, in percent by weight based on oxide content, of:

| | |
|---|---|
| $Bi_2O_3$ | 55-70 |
| $GeO_2$ | 13-21 |
| $SiO_2$ | 0.5-9 |
| $B_2O_3$ | 0-10 |
| $Li_2O$ | 0-5 |
| $Na_2O$ | 0-5 |
| $K_2O$ | 0-5 |
| $Cs_2O$ | 0-5 |
| MgO | 0-10 |
| CaO | 0-10 |
| SrO | 0-10 |
| BaO | 0-10 |
| ZnO | 0-10 |
| $TiO_2$ | 0-5 |
| $La_2O_3$ | 0-7 |
| $WO_3$ | 0-6 |
| $Nb_2O_5$ | 0-6 |
| Σ alkali metal oxides | 0-5 |
| Σ alkaline earth metal oxides | 0-10 |
| $\Sigma La_2O_3, WO_3, Nb_2O_5, TiO_2$ | 0-8 |
| at least one fining agent | 0-2, | wherein a ratio of said $Bi_2O_3$ to said $GeO_2$ is less than or equal to 5.

2. The glass as defined in claim 1, containing greater than or equal to 70% by weight of a sum of said $Bi_2O_3$ and said $GeO_2$.

3. The glass as defined in claim 1, wherein said composition, in percent by weight based on oxide content, of said glass consisting essentially of:

| | |
|---|---|
| $Bi_2O_3$ | 56-68 |
| $GeO_2$ | 14-20 |
| $SiO_2$ | 0.5-8 |
| $B_2O_3$ | 1-9 |
| $Li_2O$ | 0.5-5 |
| $Na_2O$ | 0-5 |
| $K_2O$ | 0-5 |
| $Cs_2O$ | 0-5 |
| MgO | 0-7 |
| CaO | 0-7 |
| SrO | 0-7 |
| BaO | 0-7 |
| ZnO | 0-7 |
| $TiO_2$ | 0-4 |
| $La_2O_3$ | 0-6 |
| $WO_3$ | 0-6 |
| $Nb_2O_5$ | 0-6 |
| Σ alkali metal oxides | 0.5-5 |
| Σ alkaline earth metal oxides | 0.5-7 |
| $\Sigma Bi_2O_3, GeO_2$ | >72 |
| $\Sigma La_2O_3, WO_3, Nb_2O_5, TiO_2$ | 0-7 |
| at least one fining agent | 0-2. |

4. The glass as defined in claim 1, containing from 0 to 1 percent by weight of F and/or from 0 to 1 percent by weight of $SO_4^{2-}$ and/or from 0 to 1 percent by weight of SnO and/or from 0 to 1 percent by weight of $Sb_2O_3$ as said at least one fining agent.

5. The glass as defined in claim 1, which is free of fluorine.

6. The glass as defined in claim 1, containing at most 3 ppm of a platinum component.

7. The glass as defined in claim 1, wherein said ratio of said $Bi_2O_3$ to said $GeO_2$ is less than or equal to 4.

8. A device for use in mapping, projection, telecommunication, optical communication engineering, mobile drives, laser technology, or micro lens arrays, said device comprising a glass as defined in claim 1.

9. An optical element comprising a glass as defined in claim 1.

10. A method of producing an optical element, said method comprising precise pressing a glass as defined in claim 1 in order to form the optical element.

11. The glass as defined in claim 1, wherein said composition, in percent by weight based on oxide content, of said glass consisting essentially of:

| | |
|---|---|
| $Bi_2O_3$ | 57-66 |
| $GeO_2$ | 15-19 |
| $SiO_2$ | 0.5-7 |
| $B_2O_3$ | 2-8 |
| $Li_2O$ | 0.7-3 |
| $Na_2O$ | 0-3 |
| $K_2O$ | 0-3 |
| MgO | 0-6 |
| CaO | 0-6 |
| SrO | 0-6 |
| BaO | 0-6 |
| ZnO | 0-5 |
| $TiO_2$ | 0-3 |
| $La_2O_3$ | 0-6 |
| $WO_3$ | 0-4 |
| $Nb_2O_5$ | 0-4 |
| Σ alkali metal oxides | 0.7-3 |
| Σ alkaline earth metal oxides | 1-6 |
| $\Sigma Bi_2O_3, GeO_2$ | >73 |
| $\Sigma La_2O_3, WO_3, Nb_2O_5, TiO_2$ | 0-6 |
| at least one fining agent | 0-2. |

12. A lead-free and arsenic-free optical glass with a refractive index $n_d$ of $1.91 \leq n_d \leq 2.05$ and an Abbe number $v_d$ of $19 \leq v_d \leq 25$, wherein said optical glass having a composition consisting essentially, in percent by weight based on oxide content of:

| | |
|---|---|
| $Bi_2O_3$ | 55-70 |
| $GeO_2$ | 13-21 |
| $SiO_2$ | 0.5-9 |
| $B_2O_3$ | 0-10 |
| $Li_2O$ | 0-5 |
| $Na_2O$ | 0-5 |
| $K_2O$ | 0-5 |
| $Cs_2O$ | 0-5 |
| MgO | 0-10 |
| CaO | 0-10 |
| SrO | 0-10 |
| BaO | 0-10 |
| ZnO | 0-10 |
| $TiO_2$ | 0-5 |
| $La_2O_3$ | 0-7 |
| $WO_3$ | 0-6 |
| $Nb_2O_5$ | 0-6 |
| Σ alkali metal oxides | 0-5 |
| Σ alkaline earth metal oxides | 0-10 |
| $\Sigma La_2O_3, WO_3, Nb_2O_5, TiO_2$ | 0-8 |
| at least one fining agent | 0-2, | wherein a ratio of said $B_2O_3$ to said $GeO_2$ is less than or equal to 5.

* * * * *